United States Patent [19]

Iwata et al.

[11] 4,325,621

[45] Apr. 20, 1982

[54] ELECTRONIC FLASH DEVICE

[75] Inventors: Hiroshi Iwata, Nara; Tetsuo Yamaoka, Osaka, both of Japan

[73] Assignee: West Electric Co., Ltd., Osaka, Japan

[21] Appl. No.: 263,580

[22] Filed: May 14, 1981

[30] Foreign Application Priority Data

May 16, 1980 [JP] Japan .................................. 55/65593

[51] Int. Cl.³ .................... G03B 15/03; G03B 17/00
[52] U.S. Cl. ..................... 354/145; 354/286; 362/18
[58] Field of Search ............. 362/3, 5, 11, 12, 16–19; 354/126, 129, 128, 286, 145

[56] References Cited

U.S. PATENT DOCUMENTS

| | | | |
|---|---|---|---|
| 3,167,256 | 1/1965 | Elliott | 362/18 X |
| 3,517,196 | 6/1970 | Owens | 362/16 X |
| 3,821,765 | 6/1974 | Wagner et al. | 354/128 |
| 3,823,411 | 7/1974 | Hasegawa et al. | 354/286 X |
| 4,196,997 | 4/1980 | Ohmori et al. | 354/286 |
| 4,275,953 | 6/1981 | Watanabe et al. | 354/286 X |

*Primary Examiner*—Donald A. Griffin
*Attorney, Agent, or Firm*—Burgess, Ryan and Wayne

[57] ABSTRACT

In an electronic flash device used as an artificial light source in photography, a liquid crystal plate or window is disposed in front of a flash unit comprising a flash lamp and a reflector and a voltage is applied or not applied to the liquid crystal plate or window depending upon the type; that is, the focal length or angle of view of a photographic lens attached to a camera body, whereby the angle of flash illumination can be varied suitably depending upon the lens type.

4 Claims, 8 Drawing Figures

ELECTRONIC FLASH DEVICE

BACKGROUND OF THE INVENTION

The present invention relates to an electronic flash device.

In general, the angle of flash illumination (to be referred to as "the flash-illumination angle" in this specification for brevity) of a flash unit of an electronic flash device used for flash exposures is determined depending upon an angle of view which in turn is dependent upon the focal length of the photographic lens used and the size of the film used. For instance, in the case of a single-lens reflex camera with a standard lens with a focal distance of 50 mm, the flash-illumination angle is about 40°. Therefore, with the electronic flash device designed for use with the standard lens as described above, flash exposures are not adequate with telephoto lenses or wide-angle lenses. To overcome this problem, there have been devised and demonstrated various types of electronic flash devices which may be used with various types of photographic lenses.

In one type, in response to the focal length of a photographic lens used, a reflector which is a factor for determining the flash-illumination angle is changed in configuration, but there arises the problem that the reflector becomes very complex in construction.

In another type, depending upon the focal length of a photographic lens used, a flash lamp, which is a light source, is displaced forwardly or backwardly within a reflector so that the flash-illumination angle may be varied. However, this type has the drawback that a flash unit, which comprises a flash lamp and its reflector, becomes also extremely complex in construction and that when the flash lamp is located too closely to the surface of the reflector, the latter is burned.

In a further type, an optical panel is disposed in front of a flash unit and is moved toward or away from the flash unit depending upon the focal length of a photographic lens used, whereby the flash-illumination angle is varied. However, this type also has the drawback that a mechanism for causing the optical panel to move is complex in construction and subsequently, the electronic flash device becomes large in size.

There has been also well known in the art, an electronic flash device in which a liquid crystal plate or window is used to vary the flash-illumination angle. For instance, a liquid crystal panel is disposed in front of a flash lamp and the angle of light diffusion through the panel is varied by controlling a voltage applied thereto. (See "Applications to Cameras of Liquid Crystals" by Amano, ELECTRONICS (Japanese magazine), FIG. 7, p. 1598, December 1969) However, this reference does not disclose any practical electronic flash device at all. That is, the reference teaches only the underlying principle, but does not teach how to make and use it in practice, thus obtaining advantages of using liquid crystals.

SUMMARY OF THE INVENTION

The present invention was made to overcome the above and other drawbacks encountered in the prior art electronic flash devices, and has for its object to provide an electronic flash device in which a liquid crystal plate or window is disposed in front of a flash unit and a voltage to be applied thereto is controlled depending upon the type of a photographic lens used, whereby the flash-illumination angle can be varied in a simple manner.

The above and other objects, effects and features of the present invention will become more apparent from the following description of preferred embodiments thereof taken in conjunction with the accompanying drawings.

DESCRIPTION OF THE PREFERRED EMBODIMENTS

The present invention has for its object to provide an electronic flash device of the type capable of varying the flash-illumination angle through a liquid crystal plate disposed in front of a flash lamp.

Figure 1:
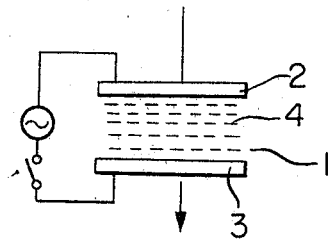
FIG. 1 is a schematic cross sectional view of a liquid crystal plate or window used in an electronic flash device in accordance with the present invention.

In FIG. 1 is schematically shown a dynamic scattering mode type liquid crystal plate which is used in the electronic flash device in accordance with the present invention. A liquid crystal plate or window 1 comprises a pair of glass plates 2 and 3 enclosing a layer of nematic liquid crystals 4 oriented homogeneously. When there is no voltage applied across the glass plates 2 and 3, the liquid crystal plate or window 1 can transmit almost all the incident light, but when a voltage is applied, the crystal molecules are disturbed, so that the coefficient of refraction of the crystal plate 1 varies. As the result, the incident light is scattered and diffused.

Figure 2:
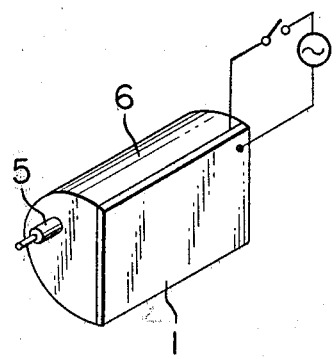
FIG. 2 is a perspective view of a first embodiment of the present invention showing only a flash unit and the liquid crystal plate or window of FIG. 1 disposed in front of the flash unit.

In FIG. 2 is shown a flash unit of a first embodiment of the present invention. The flash unit comprises a flash lamp 5, a reflector 6 and the liquid crystal plate or window 1 disposed in front of the flash lamp 5.

Figure 3:
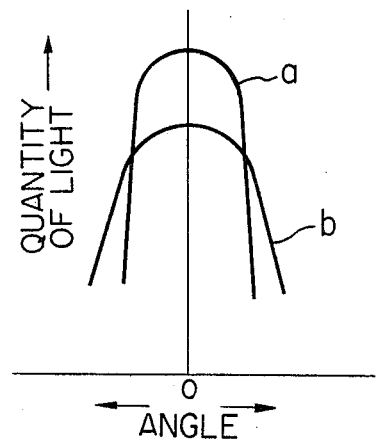
FIG. 3 shows luminance distributions of the first embodiment.

When no voltage is applied to the liquid crystal plate or window 1, a flash of light emitted from the flash lamp 5 exhibits a luminance distribution as indicated by the curve (a) in FIG. 3, but when a voltage is applied to the liquid crystal plate or window 1, a flash of light exhibits a luminance distribution as indicated by the curve (b) in FIG. 3. The peak value of the curve (b) is lower than that of the curve (a) and the curve (b) is flattened; that is, the flash-illumination angle is widened.

Figure 4:
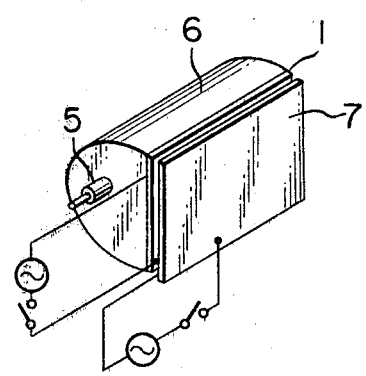
FIG. 4 is a perspective view of a second embodiment of the present invention.
Figure 5:
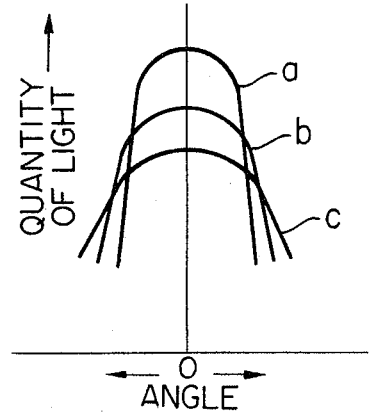
FIG. 5 shows luminance distributions of the second embodiment.

In FIG. 4 is shown a flash unit of a second embodiment of the present invention which is substantially similar in construction to the flash unit shown in FIG. 2 except that an additional liquid crystal plate or window 7 is disposed in front of the liquid crystal plate or window 1 and spaced apart therefrom by a suitable distance or brought into intimate contact therewith. When neither of the liquid crystal plate or window 1 or 7 is impressed with a voltage, a flash of light emitted from the flash lamp 5 exhibits a luminance distribution as indicated by the curve (a) in FIG. 5. When a voltage is impressed across the liquid crystal plate or window 1 but no voltage is impressed across the second liquid crystal plate or window 7, a flash of light emitted from the flash lamp 5 exhibits a luminance distribution as indicated by the curve (b); that is, the flash-illumination angle is widened as compared with the curve (a). When both liquid crystal plates or windows 1 and 7 are impressed with voltages, the luminance distribution as indicated by the curve (c) in FIG. 5 is obtained. The flash-illumination angle is further widened.

In summary, by selectively applying or not applying a voltage across the liquid crystal plate or window, the flash-illumination angle can be varied in a simple manner. In addition, when more than two liquid crystal plates or windows are disposed in front of the flash lamp as shown in FIG. 4, the flash-illumination angle can be varied stepwise so that a suitable flash-illumination angle may be selected depending upon the focal length of a photographic lens used.

Figure 6:
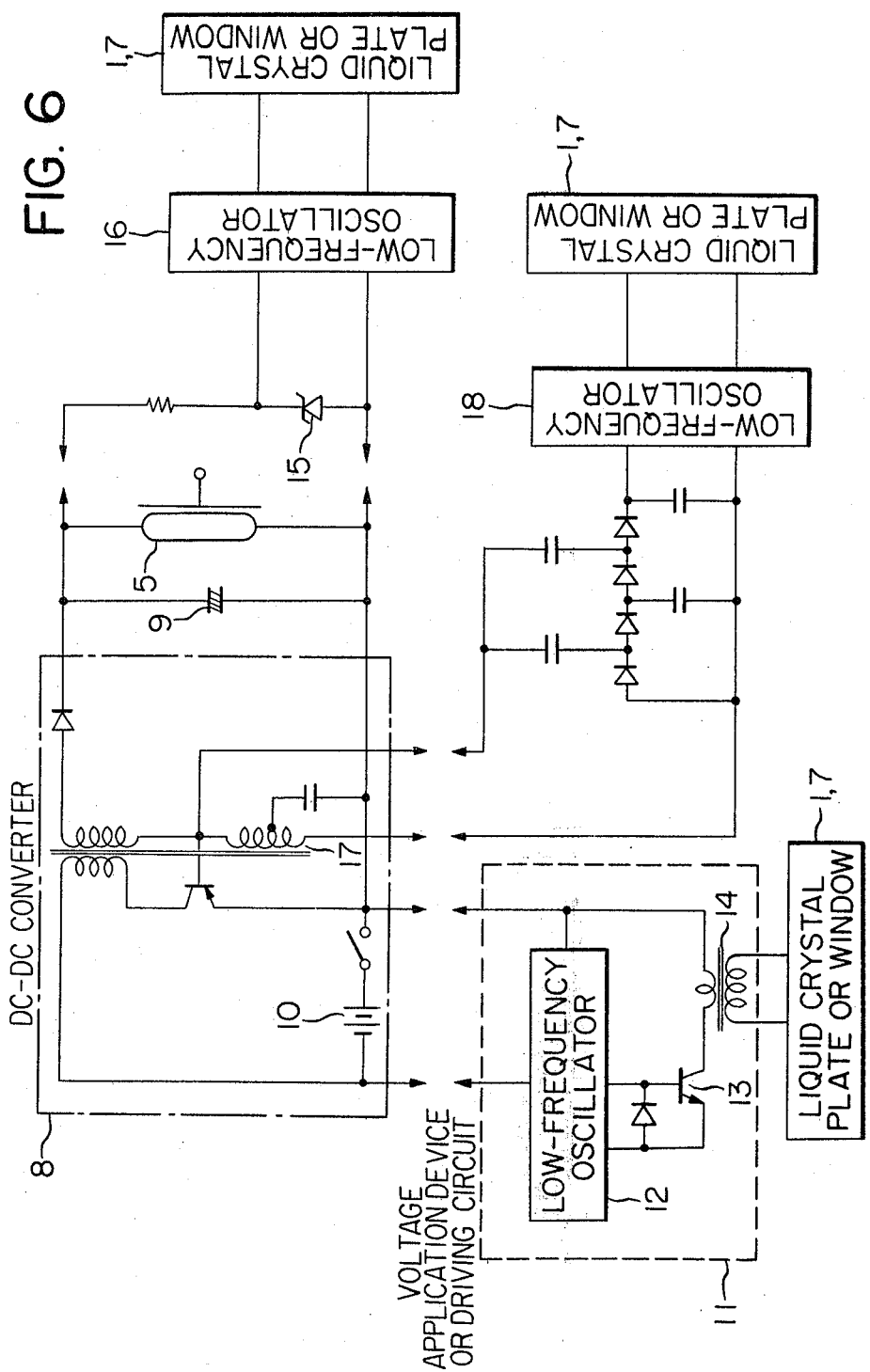
FIG. 6 is a circuit diagram showing three arrangements for applying a driving voltage to the liquid crystal plate or window.

There may be considered various schemes for applying a voltage to a liquid crystal plate or window. FIG. 6 shows a circuit diagram for applying a voltage to a liquid crystal plate or window from an electronic flash device. A voltage application device or driving circuit 11 comprising a low-frequency oscillator 12, a transistor 13 and a transformer 14 is connected to a power supply 10 in the electronic flash device so as to apply a voltage to a liquid crystal plate or window 1 or 7.

Alternatively, the voltage across a main flash capacitor 9, which is charged by the output voltage from a DC-DC converter 8, is applied through a constant-voltage diode such as a zener diode 15 to a low-frequency oscillator 16 so as to drive the liquid crystal plate or window 1 or 7.

Furthermore, the voltage induced across a base winding 17 of an oscillation transformer of the DC-DC converter 8 is rectified and applied to a low-frequency oscillator 18. Alternatively, the voltage across the winding 17 is stepped up by a predetermined time and then rectified to be applied to the oscillator 18. The output from the oscillator 18 drives the liquid crystal plate or window 1 or 7.

When a voltage must be applied to more than two liquid crystal plates or windows as in the case of the second embodiment shown in FIG. 4, the output from the oscillator 12, 16 or 18 is applied through a suitable switching means (not shown).

So far, the liquid crystal plate or window and the flash lamp 5 have been described as using the common power supply 10, but it is to be understood that an independent power supply may be used to drive the liquid crystal plates or windows.

In the first and second embodiments, the impression of a voltage on the liquid crystal plate or window 1 or 7 is manually controlled, but according to further embodiments of the present invention, the application of a voltage can be automatically controlled depending upon the focal length or the view of angle of a photographic lens when the latter is mounted on a camera as will be described in detail below.

Figure 7:
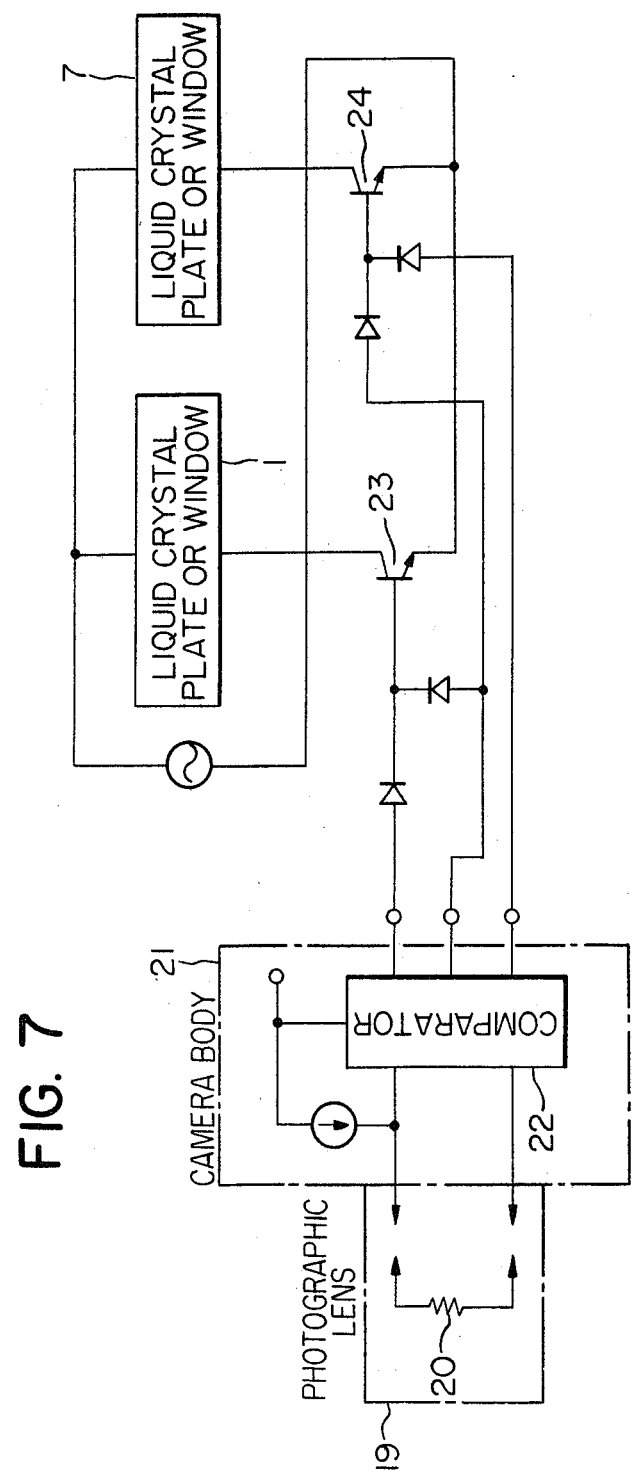
FIGS. 7 and 8 are circuit diagrams, respectively, for automatically controlling the application of driving voltages to two liquid crystal plates or windows depending upon the type of a photographic lens used.

In FIG. 7 is shown a circuit diagram of a third embodiment of the present invention. A resistor 20 has a fixed value when it is built in a photographic lens 19 as shown in FIG. 7, but when it is incorporated into a camera body 21, it is adapted to change its resistance depending upon the focal length or view of angle of a photographic lens attached on the camera body. In either case, the resistor 20 is connected in series to a constant-current source disposed in the camera body 21. The voltage drop across the resistor 20 is applied to a comparator 22 to be compared with a reference voltage. The comparator 22 has a plurality of output terminals from which is derived a digital output signal depending upon the voltage across the resistor 20. In response to the output from the comparator 22, one of switching modes of switching transistors 23 and 24 results. That is, in the first mode, both the switching transistors 23 and 24 are turned off so that neither of the liquid crystal plate or window 1 or 7 is turned on. In the second mode, the switching transistor 23 or 24 is turned on so that the liquid crystal plate or window 1 or 7 is turned on. In the third mode, both the switching transistors 23 and 24 are turned on so that both the liquid crystal plates or windows 1 and 7 are turned on.

Figure 8:
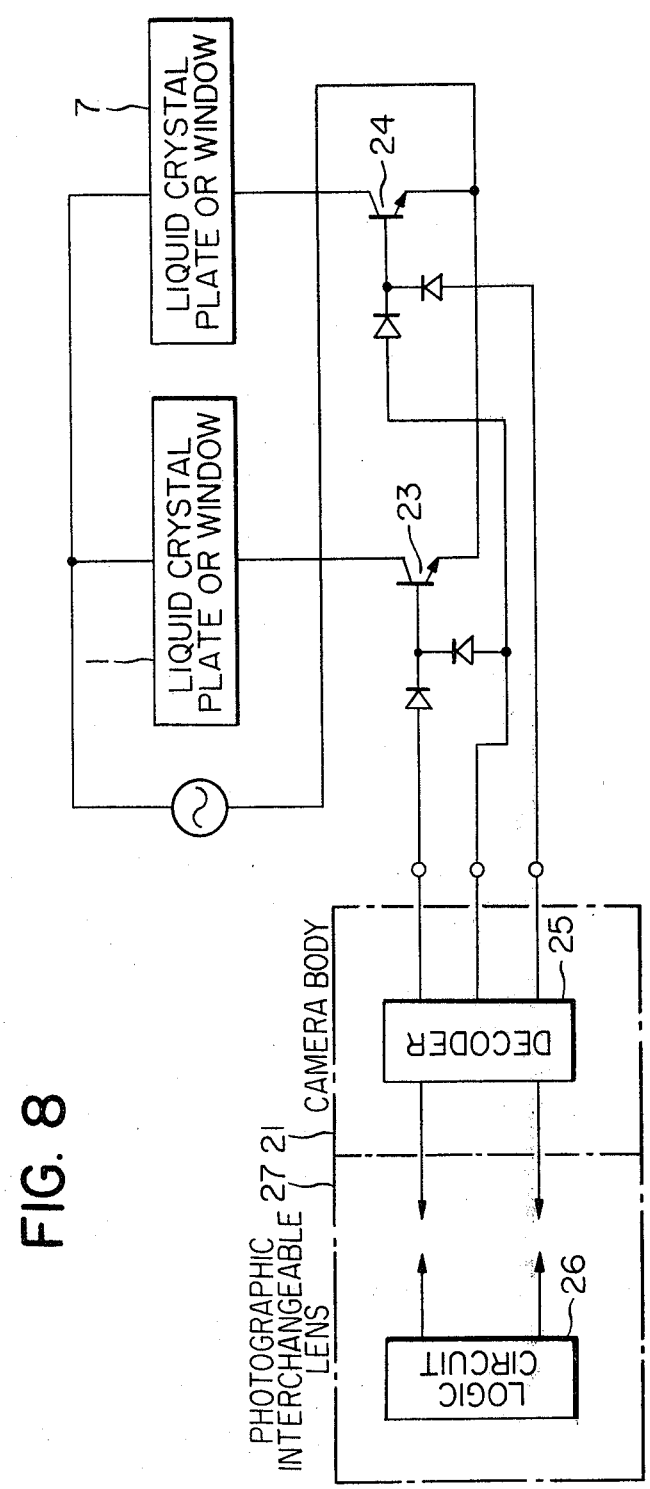

In FIG. 8 is shown a fourth embodiment of the present invention which is substantially similar in construction to the third embodiment shown in FIG. 7 except that instead of the resistor 20, a binary coded logic circuit 26 is provided. The logic circuit 26 may be built in the photographic interchangeable lens 27 or in the camera body 21 in such a way that when the lens 27 is attached to the camera body 21, the input to a decoder 25 is varied depending upon the focal length or angle of view of the photographic lens 27 attached. In response to the output signal from the decoder 25, the liquid crystal plates or windows 1 and 7 are driven in a manner substantially similar to that described in conjunction with the third embodiment.

In summary, the electronic flash device in accordance with the present invention has a liquid crystal plate or window disposed in front of a flash unit or flash lamp. Depending upon the type that is, the focal length or the angle of view of photographic lens attached, the liquid crystal plate or window is turned on or off when the flash lamp is lighted, whereby the flash-illumination angle can be varied depending upon the type of the photographic lens. Thus, the present invention provides the electronic flash device which can substantially eliminate the drawbacks of the prior art described previously in the background of the invention.

What is claimed is:
1. An electronic flash device of the type in which a liquid crystal plate is disposed in front of a flash unit comprising a flash bulb for converting the energy stored on a main flash capacitor into a flash of light and a reflector, characterized by the provision of
    a voltage application control device comprising a photographic lens detection means for detecting the type; that is, the focal length of a photographic lens attached to a camera body and generating an output signal representative of said type of said photographic lens attached,
    a switching means whose state is controlled in response to the output signal from said photographic lens detection means, and
    a driving voltage generator for generating a voltage for driving said liquid crystal plate, comprising
    a voltage detector for detecting a voltage generated in said electronic flash device,
    a voltage conversion means for converting the voltage into a driving voltage for driving said liquid crystal plate, whereby the application of said driving voltage to said liquid crystal plate is controlled by said switching means.

2. An electronic flash device as set forth in claim 1 further characterized in that said photographic lens detection means comprises a resistor disposed within a respective photographic lens, the values of the resistors in the photographic interchangeable lenses being different from each other depending upon the types thereof, a constant-current power supply for delivering a constant output current to the resistor of a photographic interchangeable lens attached to said camera body, and a level comparator responsive to the voltage drop across the resistor of the photographic interchangeable lens attached for delivering an output voltage representative of the type of said photographic interchangeable lens attached.

3. An electronic flash device as set forth in claim 1 further characterized in that said photographic lens detection means comprises a logic circuit disposed within a respective photographic interchangeable lens, the outputs from the logic circuits of the photograpic interchangeable lenses being different from each other depending upon their types, and a decoder which receives the output signal from the logic circuit of a photographic interchangeable lens attached to said camera body and delivers an output signal to said switching means, whereby the state of said switching means is selected dependng upon the type of the photographic interchangeable lens attached.

4. An electronic flash device as set forth in claim 1 further characterized in that a plurality of liquid crystal plates are disposed in overlying relationship in front of said flash unit.

* * * * *